April 14, 1970 R. SCHMIDT 3,505,893
MULTIPLE SPEED INTERNAL GEAR TRANSMISSION
Filed March 4, 1968 2 Sheets-Sheet 1

INVENTOR
RICHARD SCHMIDT

BY Cushman, Darby & Cushman
ATTORNEYS

April 14, 1970  R. SCHMIDT  3,505,893
MULTIPLE SPEED INTERNAL GEAR TRANSMISSION
Filed March 4, 1968  2 Sheets-Sheet 2

INVENTOR
RICHARD SCHMIDT
BY
Cushman, Darby & Cushman
ATTORNEYS

United States Patent Office

3,505,893
Patented Apr. 14, 1970

3,505,893
MULTIPLE SPEED INTERNAL GEAR TRANSMISSION
Richard Schmidt, 11525 Islandale, Cincinnati, Ohio 45240
Filed Mar. 4, 1968, Ser. No. 710,025
Int. Cl. F16h 3/08
U.S. Cl. 74—325      10 Claims

ABSTRACT OF THE DISCLOSURE

Increased gearing flexibility is achieved in a multiple speed internal gear transmission. A pair of flexible couplings are provided for a power input and an axially-aligned power output shaft so that each of the shafts is adapted to be radially displaced or shifted in a direction perpendicular to its respective axis. The power input may therefore be "plugged in" directly to any of a set of vertically-aligned power gears, all of which are in mesh with and mounted within a driven internal ring gear. After the power flows through one of the power gears, a radially displaceable output shaft permits a direct "plug in" power takeoff from any of the vertically-stacked power gears. The transmission thus provides a wide range of speed variations, while using a relatively small number of gear trains mounted in a compact housing.

BACKGROUND AND BRIEF DESCRIPTION OF THE INVENTION

This invention relates to a multiple speed internal gear transmission. The invention is intended to be used in conjunction with a high speed, high torque driving instrumentality, such as a motor and a suitable driven instrumentality such as industrial machinery.

Conventional multispeed transmission systems have been hampered by the fact that they necessarily consume a large amount of space. This is due to the fact that lengthy transmission shafts are required to hold the large number of gear wheels which are necessary to provide a desired range of speed ratios. The presence of long transmission shafts, and a large number of gear wheels in turn necessitate a large housing in order to protect the transmission system. Moreover, the length of the transmission shaft often produces gear shaft vibration while the unit is running, causing excessive wear and other undesirable effect in the system.

The inherent limitations of prior multispeed transmissions have retarded technical development in related areas of transmission technology. Since conventional power transmission shafts are axially aligned, all of the power gears are mounted on one of a pair of lengthy shafts which are adapted to slide axially over one another until the desired gear ratio is achieved. Axial shifting thus locks into the transmission system several inherent drawbacks, which have been mentioned previously. These drawbacks have caused problems in the design and construction of apparatus associated with the conventional systems.

It is apparent therefore, that previous attempts to produce a multispeed transmission system which is of a relatively compact construction and yet provides a wide range of speed ratios have been less than fully successful.

On the other hand, the present invention solves the problems associated with conventional transmission systems providing a wide range of speed variations, while using a small number of gear trains which are mounted in a compact housing unit. This is accomplished by vertically aligning or "stacking" a plurality of power gear wheels in a plane which is perpendicular to the power shafts, and providing means for shifting or radially displacing each of the shafts in a direction perpendicular to its respective axis, as opposed to the axial shifting of conventional systems. Thus, each of the power shafts may be engaged or "plugged in" to any of the power gear wheels, which provides a broad range of speed ratios, while at the same time employing a relatively small number of gear wheels or trains. In other words, fewer gears are needed to afford a given number of speed changes.

Moreover, the fact that the gear trains are vertically stacked permits the use of short transmission shafts as compared to conventional transmission shafts. Also gear shaft vibration, a potential cause of excessive wear and other system malfunctions, is eliminated and the transmission housing can be of a simple, compact construction.

Furthermore, each of the power shafts can be shifted during gear operation, that is, while the system is running. Additionally, the housing need not be of a sealed, massive construction, and does not have to be lubricated within a sealed housing.

A brief description of the improved multispeed transmission system follows:

A pair of flexible couplings are connected respectively to a power input shaft and an axially-aligned power output shaft so that each of the shafts is adapted to be radially displaced in a direction perpendicular to its respective axis. The construction of the flexible couplings may be varied, so long as the desired radial displacement of the shaft is effected. It is preferred, however, that the coupling disclosed in U.S. Patent 3,242,694 be utilized in conjunction with the inventive system. Accordingly, the disclosure embodied in U.S. Patent 3,242,694 is hereby incorporated into the instant specification by reference.

A driver internal toothed ring gear is mounted within the transmission housing. A set of vertically aligned or stacked externally toothed power gear wheels are mounted within the internal gear. Any of the power gear wheels are adapted to be in mesh with the driven internal gear. A gear shift and a clutch mechanism enable the radially displaceable input and output shafts to be coupled to any of the power gear wheels. The clutch which is employed may be a cone clutch, a disc clutch or the like.

Consequently, when power from a driving instrumentality such as a motor is imparted to the input shaft, it is transmitted or "plugged in" directly to one side of any of the power gears, in accordance with the desires of the user. The fact that the output shaft is also radially displaceable enables it to be engaged with or coupled to the other side of any of the aforementioned gear wheels. Each of the power gears is mounted on a stub shaft, the opposite ends of which are adapted to be coupled to a clutch. This arrangement therefore permits a direct power takeoff from any of the power gear wheels.

Thus, if the input shaft and output shaft are coupled to opposite sides of the same gear wheel the power will be transmitted through the gear without changing the speed ratio between the input and output shafts. In this case, the internal ring gear acts as an idler gear. On the other hand, if the input and output shafts are coupled to different gear wheels, the input shaft will drive the coupled power gear wheel, and the gear wheel will drive the internal gear; the internal gear will in turn drive each of the remaining gear wheels. Thus, the speed of the output shaft will be dependent upon which of the other power gear wheels to which it is coupled.

The inventive system therefore solves the problems created by conventional transmission systems in that it provides a broad range of speed variations while using a relatively small number of gear trains. Expressed mathematically, if V represents the number of possible output shaft variations, and Z represents the number of external power gear wheels, one may obtain the possible speed variations by:

$$V = (Z^2 - Z + 1)$$

Specifically, if 6 external gear wheels are used, a user may obtain 6 input and 6 output shaft positions, which provide 36 shifting possibilities, or 31 different speed variations for the output shaft.

Moreover, since the gear trains or external gear wheels are vertically stacked in a plane perpendicular to the axis of the power shafts, the gear shafts may be relatively short. The fact that the shafts are not lengthy virtually eliminates gear shaft vibration; as previously explained, gear shaft vibration can lead to excessive wear and other harmful effects in a transmission system.

It necessarily follows from the foregoing discussion that the inventive transmission system will be compact, thus affording a substantial saving in space and enabling the space which is saved to be productively used. Furthermore, the transmission shafts can be shifted during gear operation; in other words, while the system is running the input and output shafts may be radially displaced as required in order to achieve increased gearing flexibility.

In addition to the advantages mentioned above, other advantages will become apparent in the more detailed description of the invention which follows: reference will be made to the accompanying drawings in which.

DETAILED DESCRIPTION OF THE INVENTION

Figure 1:
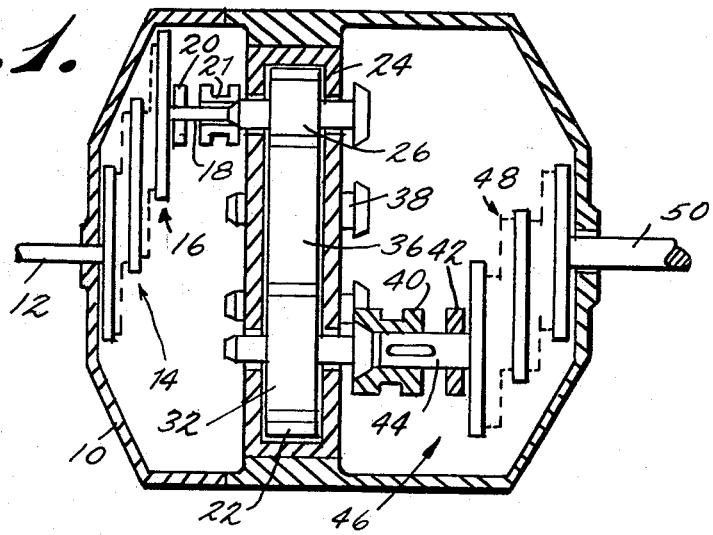
FIGURE 1 is a partially schematic cross sectional representation of the inventive transmission system.
Figure 2:
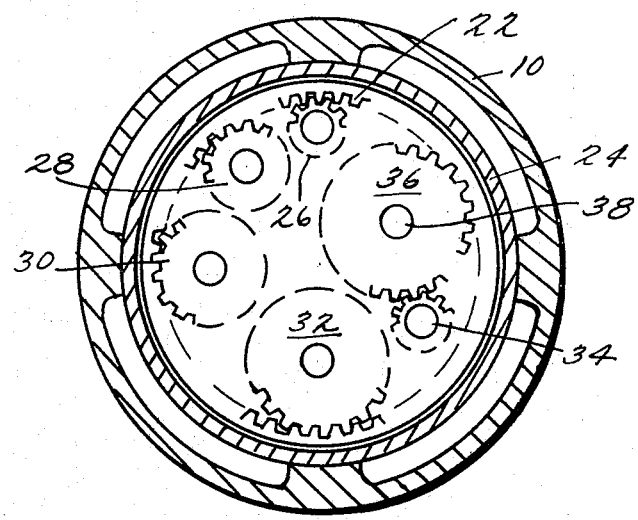
FIGURE 2 is a sectional view of the system taken through lines 2—2 of FIGURE 1 in the direction of the arrows.

Referring to FIGURES 1 and 2 of the drawings, a housing 10 is provided for the inventive transmission system. A conventional power source (not shown in the drawings), drives a shaft 12 of a power shaft which is generally designated 14 in the drawings. Power shaft 14 includes shaft 12, a flexible coupling generally designated 16, and an input shaft 18. Flexible coupling 16 will be more fully discussed hereinafter. A gear shift 20 and a clutch 21 are mounted on input shaft 18 in a conventional manner. The clutch 21 is a cone clutch; as will be discussed below, a disc clutch or other known clutches could be used in lieu of the cone clutch 21.

A driven internal toothed ring gear 22 is mounted within an internal gear housing 24. Internal gear housing 24 is in turn suitably mounted to the transmission housing 10. Internal gear 22 is preferably a spur gear. Mounted within internal ring gear 22 are a plurality of external toothed power gear wheels numbered 26, 28, 30, 32, 34 and 36 respectively. Each of the external power gear wheels are adapted to mesh with internal gear 22. All of the external gear wheels are preferably spur gears. As is apparent from FIGURE 2 of the drawings, the gears are of various diameters in order to afford a broad range of speed ratios between the input and output shafts of the transmission. External gear 34 is a reversing gear wheel which is adapted to be in mesh with the internal ring gear 22 by means of external gear 36. In FIGURE 1 of the drawings it is seen that the external gears 26 through 36 are vertically-aligned or vertically stacked; in other words, the gears are aligned in a plane which is perpendicular to the power shafts of the transmission. While a total of 6 external gear wheels are depicted in FIGURE 2 of the drawings, the number of power gears employed may, of course, be varied in accordance with the particular needs of the transmission system.

Viewing FIGURE 1 of the drawings, it is apparent that each of the external gear wheels 26 through 36 is mounted on an individual stub shaft 38. Each of the stub shafts 38 is tapered at the input end in order to be selectively engageable with the cone clutch 21, while the output end is enlarged in order to impart or transmit power to clutch 40. Clutch 40 and its associated gear shaft 42 are mounted on an output shaft 44 which is part of an arrangement which is essentially identical to that described above with respect to power shaft 14. Consequently, the powered shaft of the transmission is generally designated 46 in the drawings, and includes output shaft 44, a flexible coupling generally indicated 48, and a shaft 50.

The use of a relatively short transmission stub shaft 38 is made possible because of the vertically-stacked arrangement of the power gears 26–36, as well as the radially displaceable input shaft 18 and output shaft 44. The flexible couplings 16 and 48 allow the input and output shafts 18 and 44 to be shifted in a direction which is perpendicular to their respective axis. Thus, input shaft 18 and output shaft 44 may be engaged or "plugged in" to any of the external gear wheels 26 through 36 by means of an appropriate adjustment of the respective gear shifts 20 and 42. The present invention is therefore capable of providing a broad range of speed ratios, while at the same time using less gears to do the job than any of the prior conventional transmission systems.

Mathematically expressed, if Z represents the number of external gear wheels, and V equals the number of possible speed variations of output shaft 44, one may obtain $$V = (Z^2 - Z) + 1$$

speed variations. Specifically, where 6 external gear wheels are employed a user may obtain a multiple of 6 input and 6 output shaft positions merely by appropriately repositioning the radially displaceable input shaft 14 and output shaft 44. Thus, in the arrangement depicted in FIGURES 1 and 2 of the drawings there are 36 different shifting possibilities, as well as 31 different speed ratios for the powered shaft 46.

More specifically, the chart which follows details the possible speed variations of output shaft 44.

POSSIBLE SPEED VARIATIONS OF OUTPUT SHAFT (Output shaft velocity) = (Input shaft velocity) × (Ratio of wheel diameters)
$N_o$ = $N_i$ × $R$

| Gear shift Number | | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| $R_f$—Ratio of wheel diameter (forward): | Input wheel diameter | $d_1$ | $d_1$ | $d_1$ | $d_1$ | $d_2$ | $d_2$ | $d_2$ | $d_2$ | $d_3$ | $d_3$ | $d_3$ | $d_3$ | $d_4$ | $d_4$ | $d_4$ | $d_4$ | $d_5$ | $d_5$ | $d_5$ | $d_5$ | $d_5$ |
| | Output wheel diameter | $d_2$ | $d_3$ | $d_4$ | $d_5$ | $d_1$ | $d_3$ | $d_4$ | $d_5$ | $d_1$ | $d_2$ | $d_4$ | $d_5$ | $d_1$ | $d_2$ | $d_3$ | $d_5$ | $d_1$ | $d_2$ | $d_3$ | $d_4$ | $d_5$ |

| Gear shift number | | 22 | 23 | 24 | 25 | 26 | 27 | 28 | 29 | 30 | 31 |
|---|---|---|---|---|---|---|---|---|---|---|---|
| $R_r$—Ratio of wheel diameter (reverse): | Input wheel diameter | $d_6$ | $d_6$ | $d_6$ | $d_6$ | $d_6$ | $d_1$ | $d_2$ | $d_3$ | $d_4$ | $d_5$ |
| | Output wheel diameter | $d_1$ | $d_2$ | $d_3$ | $d_4$ | $d_5$ | $d_6$ | $d_6$ | $d_6$ | $d_6$ | $d_6$ |

$d_1$ Represents the diameter of power gear 26; $d_2$ represents the diameter of power gear 28; $d_3$ represents the diameter of power gear 30; $d_4$ represents the diameter of power gear 32; $d_5$ represents the diameter of power gear 36; $d_6$ represents the diameter of power gear 34.

One arrives at the various possibilities by the equation:

$$N_o = N_i \times R$$

where $N_o$ is the output shaft velocity, $N_i$ is the input shaft velocity and R is the ratio of the gear wheel diameters. Thus, in the configuration depicted in FIGURE 1 of the drawings, the aforementioned formula will read as follows:

$$N_o = N_i \times \frac{d_{26}}{d_{32}}$$

where $d_{26}$ is the diameter of gear wheel 26 and $d_{32}$ is the diameter of gear wheel 32.

It becomes evident then, that the present invention represents a significant advance over the conventional transmission systems of the past. The inventive system affords a broad range of possible speed ratio variations while simultaneously using fewer gear wheels than conventional systems would employ to achieve an analogous result. Moreover, the use of short transmission stub shafts permit the design and construction of a compact housing and transmission system, as well as eliminating gear shaft vibration which is present in the lengthy shafts of prior transmissions.

Figure 3:
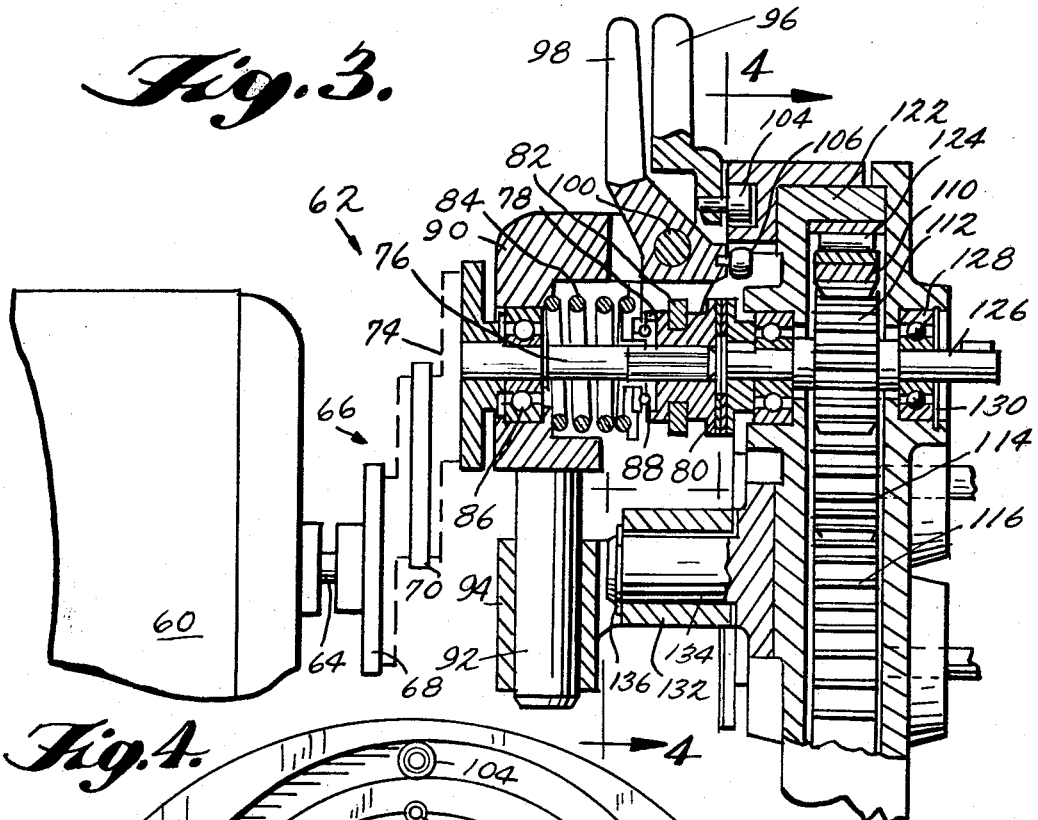
FIGURE 3 is a cross sectional view of a modified embodiment of the transmission system which depicts the input shaft and associated gear shifting mechanism.
Figure 4:
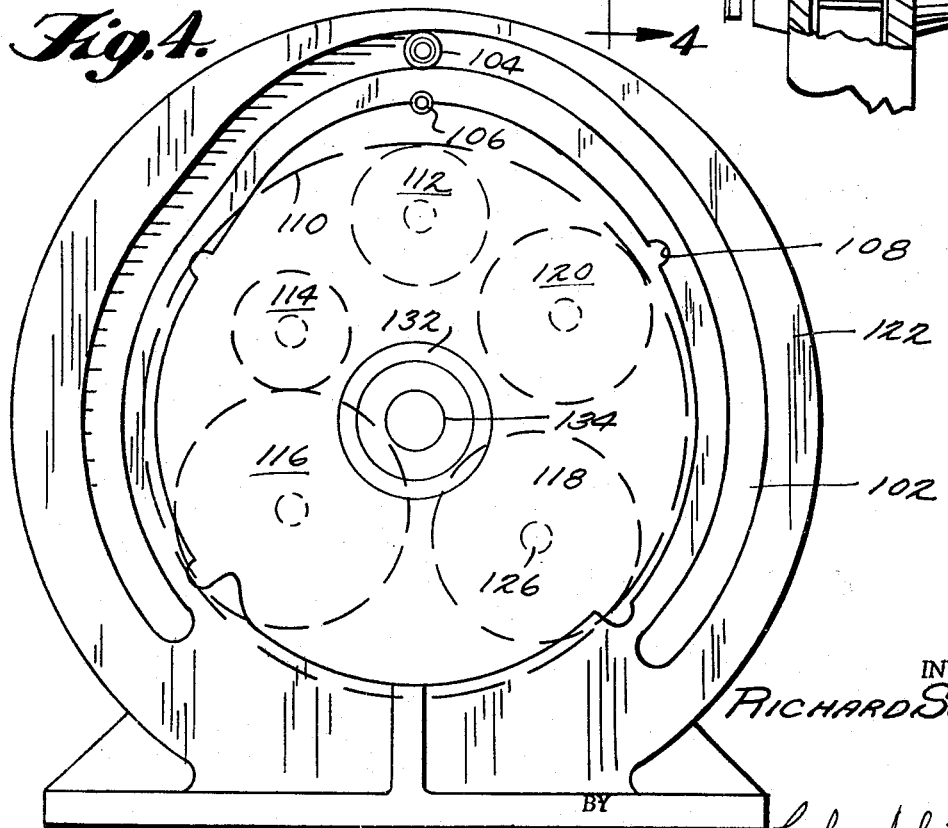
FIGURE 4 is a cross sectional view of FIGURE 3 taken through lines 4—4 in the direction of the arrows.

Referring now to FIGURES 3 and 4 of the drawings, a view of a slightly modified embodiment of the inventive system is depicted. FIGURES 3 and 4 of the drawings set forth a more detailed view of the inventive transmission system, In particular, a detailed view of a gear shifting and clutching mechanism which may be employed with the present system is shown by these drawings. It should be understood that FIGURE 3 of the drawings discloses what might be termed the "input half" of the inventive transmission system. It will be noted that the stub shafts are only partially shown at the output side. It will be understood therefore, that the gear shifting mechanism as well as the clutch mechanism and the associated power takeoff will be identical for the half of the system which is not shown, except as expressly stated otherwise. Accordingly the description of the "input half" of the system which follows will be equally applicable to the "output half" of the invention. In FIGURE 3 of the drawings, a conventional motive power source such as a motor 60 is shown. Motor 60 is capable of transmitting power to a power shaft generally designated 62 by means of a shaft 64. The power is transmitted from shaft 64 through flexible coupling 66 to input shaft 76.

Figure 5:
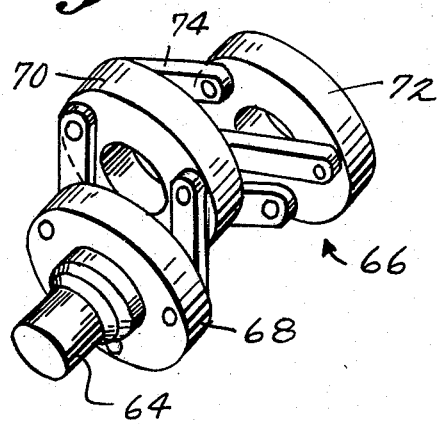
FIGURE 5 is a perspective view of the coupling means which are preferably used in conjunction with the system.

Turning now to FIGURE 5 of the drawings, a preferred flexible coupling 66 is disclosed. As mentioned previously, the construction of the flexible couplings may be varied, so long as the desired radial displacement of the power shafts is effected. It is preferred however, that the coupling disclosed in U.S. Patent 3,242,694 be utilized in conjunction with the present inventive system. Accordingly, the disclosure embodied in U.S. Patent 3,242,694 is hereby incorporated into the present specification by reference. Coupling 66 is a parallel-shaft coupling, and consists essentially of three discs rotating in unison and interconnected in series by six links.

In operation, all three rotary discs 68, 70 and 72 rotate with equal velocity. Each of the links 74 is arranged in parallelogram fashion and is rotatably secured to the corresponding disc members by means of bolts or the like. Links 74 are denoted by the broken lines in FIGURE 3 of the drawings. The third main portion of power shaft 62 is comprised by input shaft 76. Input shaft 76 is mounted within disc 72 of flexible coupling 66, and is hence capable of movement in unison with the flexible coupling. The "parallelogram" coupling 66 assists in bringing a new measure of versatility or flexibility to gear transmission design by permitting both input and output shafts to clutch or couple directly to any of a plurality of power gears.

Returning to FIGURE 3, mounted in any suitable manner on input shaft 76 is disc clutch 78. Disc clutch 78 is depicted in the closed or coupled position, and is selectively engaged with or coupled to one of a plurality of external toothed power gear wheels. Also depicted in FIGURE 3 are clutch disc 80, clutch ring 82 and a compression spring 84 which biases the clutch 78 toward the closed rather than the open position. Shown also are a pair of bearing races 86 and 88.

The input shaft 76 and associated clutching apparatus are suitably mounted within a portion of a housing member 90. Also secured to housing 90 is a guide rod or shaft 92. Shaft 92 is capable of vertically sliding within guide block 94. A gear stick 96 and a clutch stick 98 are also mounted on housing member 90. Gear stick 96 and clutch stick 98 are coupled to one another by means of pin 100.

Looking now at FIGURE 4 as well as FIGURE 3 of the drawings, when it is desired to move clutch stick 98, the clutch stick and gear stick 96 are manually squeezed together. This unlocks or snaps lock roller 106 out of one of a plurality of lock grooves 108, thus enabling both the gear stick and the clutch stick to be moved to any one of a plurality of desired locations. Gear stick 96 is moved through guide groove 102 by means of guide roller 104. When the desired gear ratio is reached, the operator merely allows the gear stick and clutch stick to return to their normal positions. When he does so, the lock roller 106 will snap into the appropriate lock groove and input shaft 76 will then be engaged with an appropriate power gear via disc clutch 78. While a manual gear shifting mechanism has been disclosed, it is evident that the employment of an automatic shifting mechanism is also within the scope of the present invention.

It is apparent from FIGURE 4 of the drawings that driven internal toothed ring gear 110 is in mesh with external toothed power gear wheels 112, 114, 116, 118 and 120. It will be noted that 5 external power gears are used in this arrangement, as compared to 6 power gears which were used in the system depicted in FIGURES 1 and 2. As mentioned previously, the number of power gears in the system may be varied as desired. The external power gears 112 through 120 are vertically arranged or stacked in the same manner as previously described. As before, at least one revising gear is provided in the system. In this case, gear wheel 114 serves as a reversing gear. Once again, all of the gears involved are spur gears. Gears 110 through 120 are mounted to an internal gear housing 122. Rotation of internal gear 110 is assisted by providing a roller bearing 124 in operative association with the internal ring gear 110. As before, a plurality of relatively short transmission stub shafts 126 for receiving and transmitting power are employed. Each of the external gears 112 through 120 is mounted on an individual stub shaft 126, and a pair of bearing races 128 are provided on either side of each of the power gear wheels. In addition, a retaining ring or washer 130 secures the bearing race 128 within the housing.

Guide block 94 is provided with a sleeve member 132. Sleeve 132 is rotatably mounted on a shaft 134 which in turn is fixed to the housing of the system. Retaining ring 136 ensures that the sleeve 132 does not slide off of shaft 134. This arrangement enables the entire housing 90, together with all of the apparatus which is housed therein, to rotate in a clockwise or counterclockwise direction as the gear shifting meachnism is moved to a desired position.

In operation, power from source 60 is transmitted through power shaft 62, which includes shaft 64, flexible coupling 66 and input shaft 76 to clutch 78 and then to external power gear wheel 112. Gear wheel 112 then drives internal gear 110, and depending upon the position of the radially displaceable output shaft (not shown in the drawings) the gear ratio or speed ratio will be changed by selectively engaging the powered output shaft with one of the external gears 114 through 120. When it is desired to shift or radially displace the input shaft 76, the operator merely squeezes gear stick 96 and clutch 98 together, disengaging lock roller 106, and moves the sticks 96 and 98 to the desired position. When he reaches this position he releases clutch stick 98 and it immediately locks into the appropriate lock groove 108 by means of lock roller 106. At this point, the clutch is engaged and the speed ratio between the input and output shafts is expeditiously and effectively changed. It is apparent that this shifting or radial displacement of the input and output shafts can take place during gear operation; in other words, while the system is ruuning both the input and output shafts may be radially displaced as required in order to achieve increased gearing flexibility.

It is evident that the present invention constitutes a significant advance over prior conventional transmission systems, by providing a plurality of vertically stacked or aligned power gears in conjunction with a power input shaft and a powered output shaft which are radially displaceable with respect to their respective axis. These features of the present invention in turn permit an extremely compact transmission system to be built, with a consequent saving in space. Moreover, the fact that relatively short transmission stub shafts can be used leads to other advantages over prior systems, among which is the fact that gear shaft vibration is virtually eliminated, thus obviating excessive wear and other harmful effects in the inventive system. Finally, the invention provides a broad range of speed ratios while simultaneously using fewer gears than do conventional systems of the past.

Although the transmission of this invention has been described with reference to a particular embodiment, it will become apparent to those skilled in the art that varitions can be made in the transmission. All such variations as would be obvious to those skilled in this art are intended to be included without the scope of this invention.

What is claimed is:

1. In a system for transmitting power from an input shaft to an output shaft and for selectively changing the speed ratio between said input and output shafts, the improvement comprising:
   a plurality of gear means mounted on individual shafts in such a way (a) that each gear means of said plurality can be selectively connected with said input shaft and (b) that each gear means of said plurality can be selectively connected with said output shaft, and said plurality of gear means being operatively driven relative to one another so that power can be transmitted from a gear means selected for connection with the input shaft to a gear means selected for connection with the output shaft,
   first means for radially displacing said input shaft with respect to its axis of rotation,
   second means for radially displacing said output shaft with respect to its axis of rotation, and
   means carried by the radially displaceable input and output shafts for selectively engaging any of said shafts in a driving or driven retlationship, respectively, with the gear means selected from said plurality of gear means.

2. The system of claim 1 in which said plurality of gear means are mounted in stacked relation to one another in a plane substantially perpendicular to said input and output shafts.

3. The system of claim 2 in which one gear means of said plurality comprises an internal ring gear and wherein the remaining gear means comprise external gear wheels.

4. The system of claim 3 in which said internal ring gear is adapted to function as an idler gear when said input shaft and said output shaft engage a common external gear wheel.

5. The system of claim 4 in which said external gear wheels include at least one reversing gear.

6. The system of claim 5 including at least five external gear wheels.

7. The system of claim 1 in which each of said first and second means for radially displacing said shafts includes a flexible coupling means operatively connected to the respective input and output shafts.

8. The system of claim 7 in which each of said flexible couplings is actuated by a gear shifting mechanism, including a gear stick and a clutch stick, each said flexible coupling being operatively connected to a gear shifting mechanism in order to move in unison with said shifting mechanism.

9. The system of claim 8 in which each of said means for selectively engaging said gear shafts includes a clutch member which is mounted on its respective input or output shaft.

10. The system of claim 8 in which each of said flexible couplings comprises:
   at least three rotary members, including a first rotary member, a second rotary member and an intermediate rotary member,
   a first series of at least three link members of substantially identical construction disposed in parallel relation to one another and having their ends rotatably connected respectively with said first rotary member and said intermediate rotary member, and
   a second series of at least three link members of substantially identical construction disposed in parallel relation to one another and having their ends rotatably connected respectively with said intermediate rotary member and said second rotary member, wherein all of said rotary members are adapted to rotate with equal velocity in order to transmit power at a constant rate.

References Cited

UNITED STATES PATENTS

| | | | |
|---|---|---|---|
| 704,645 | 7/1902 | Isler | 74—356 |
| 2,280,683 | 4/1942 | Bedford | 74—331 X |
| 2,920,495 | 1/1960 | Kepes et al. | 74—325 |
| 2,938,398 | 5/1960 | Demarest | 74—332 X |
| 3,242,694 | 3/1966 | Schmidt | 180—70 |
| 3,407,675 | 10/1968 | Bodge | 74—331 X |

ARTHUR T. McKEON, Primary Examiner

U.S. Cl. X.R.

74—331, 332, 356

UNITED STATES PATENT OFFICE
CERTIFICATE OF CORRECTION

Patent No. 3,505,893          Dated  April 14, 1970

Inventor(s) Richard Schmidt

It is certified that error appears in the above-identified patent and that said Letters Patent are hereby corrected as shown below:

On each sheet of drawings and in the heading at the top of column 1 of the specification, the title of the patent should be corrected to remove the word "INTERNAL".

SIGNED AND
SEALED
SEP 15 1970

(SEAL)
Attest:

Edward M. Fletcher, Jr.
Attesting Officer

WILLIAM E. SCHUYLER, JR.
Commissioner of Patents